United States Patent
Kawamura et al.

(10) Patent No.: US 11,793,182 B2
(45) Date of Patent: Oct. 24, 2023

(54) FISHING ROD HAVING ROD BODY TO WHICH ATTACHMENT IS ATTACHED, TUBULAR BODY AND PRODUCTION METHOD THEREFOR

(71) Applicant: Globeride, Inc., Tokyo (JP)

(72) Inventors: Takuji Kawamura, Tokyo (JP); Nobuhiro Izaki, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 334 days.

(21) Appl. No.: 16/488,652

(22) PCT Filed: Mar. 7, 2018

(86) PCT No.: PCT/JP2018/008744
§ 371 (c)(1),
(2) Date: Aug. 26, 2019

(87) PCT Pub. No.: WO2018/164177
PCT Pub. Date: Sep. 13, 2018

(65) Prior Publication Data
US 2019/0373875 A1 Dec. 12, 2019

(30) Foreign Application Priority Data
Mar. 10, 2017 (JP) .................. 2017-046641

(51) Int. Cl.
*A01K 87/04* (2006.01)
*A01K 87/06* (2006.01)
(52) U.S. Cl.
CPC .............. *A01K 87/04* (2013.01); *A01K 87/06* (2013.01)

(58) Field of Classification Search
CPC ........ A01K 87/00; A01K 87/02; A01K 87/04; A01K 87/06
(Continued)

(56) References Cited

U.S. PATENT DOCUMENTS 3,171,229 A * 3/1965 Shobert .................. A01K 87/04
43/24
4,821,447 A * 4/1989 Nakayama ............. A01K 87/06
156/188
(Continued)

FOREIGN PATENT DOCUMENTS

CN 1394475 A 2/2003
CN 103841823 A 6/2014
(Continued)

OTHER PUBLICATIONS

The Extended European Search Report dated Apr. 24, 2020, of counterpart European Application No. 18763817.6.
(Continued)

*Primary Examiner* — Darren W Ark
*Assistant Examiner* — Katelyn T Truong
(74) *Attorney, Agent, or Firm* — K&L Gates LLP

(57) ABSTRACT

A fishing rod has a rod body and an attachment portion, and includes: an attachment attached to the outer peripheral face of the rod body with the attachment portion; a first layer formed by winding a first sheet around both the attachment portion and the rod body; and a second layer formed by winding a second sheet made of fiber-reinforced resin on the outer side of the first sheet, wherein the tensile elongation measured in accordance with JIS K 7161-1 of the first sheet is greater than that measured in accordance with JIS K 7161-1 of the second sheet.

11 Claims, 5 Drawing Sheets

(58) Field of Classification Search
USPC .............................................. 43/18.1 R, 18.5
See application file for complete search history.

(56) References Cited

U.S. PATENT DOCUMENTS

| | | | | |
|---|---|---|---|---|
| 5,090,150 | A * | 2/1992 | Pirazzini | A01K 87/04 43/24 |
| 5,926,992 | A * | 7/1999 | Tsurufuji | A01K 87/002 43/24 |
| 6,524,195 | B1 * | 2/2003 | Kusumoto | A63B 53/10 473/319 |
| 2005/0178040 | A1 * | 8/2005 | Kato | A01K 87/00 43/18.1 R |
| 2005/0223617 | A1 * | 10/2005 | Morita | A01K 87/00 43/18.5 |
| 2013/0172098 | A1 * | 7/2013 | Shiga | A63B 53/10 473/318 |
| 2015/0296761 | A1 | 10/2015 | Sugaya et al. | |

FOREIGN PATENT DOCUMENTS

| | | | |
|---|---|---|---|
| IT | 236872 Y1 * | 8/2000 | |
| JP | 60-156963 U | 10/1985 | |
| JP | 02-026474 U1 | 2/1990 | |
| JP | 06-14678 A | 1/1994 | |
| JP | H11-046631 A | 2/1999 | |
| JP | 2003-219770 A | 8/2003 | |
| JP | 2004-194563 A | 7/2004 | |
| JP | 2006-006230 A | 1/2006 | |
| JP | 2008-263841 A | 11/2008 | |
| JP | 2009-033987 A | 2/2009 | |
| JP | 2009178132 A * | 8/2009 | |
| JP | 2014-098108 A | 5/2014 | |

OTHER PUBLICATIONS

Chinese Office Action dated Mar. 1, 2021, of counterpart Chinese Application No. 201880015324.9, along with an English translation.
Japanese Office Action for related Japanese Application No. 2019-504634; action dated Dec. 7, 2021; (7 pages).
Chinese Office Action and English Translation for related Chinese Application No. 201880015324.9; action dated Oct. 19, 2021; (9 pages).
Japanese Office Action for related Japanese Application No. 2019-504634; action dated Mar. 22, 2022; (6 pages).
Office Action for related Korean Application No. 10-2019-706113; action dated Dec. 25, 2022; (11 pages).
Office Action for related Korean Application No. 10-2019-7026113; action dated Dec. 25, 2022; (11 pages).

* cited by examiner

FISHING ROD HAVING ROD BODY TO WHICH ATTACHMENT IS ATTACHED, TUBULAR BODY AND PRODUCTION METHOD THEREFOR

CROSS-REFERENCE

This application claims priority from Japanese Patent Application No. 2017-046641 (filed on Mar. 10, 2017), the contents of which are incorporated herein by reference in their entirety.

TECHNICAL FIELD

This disclosure relates to a fishing rod having a rod body to which an attachment is attached, a tubular body, and a production method therefor.

BACKGROUND

There exists a fishing rod having a rod body to which an attachment such as a fishing line guide or a reel seat is attached. Conventionally, the attachment is attached to the rod body with a thread or a resin sheet.

A fishing rod having an attachment attached to a rod body with a thread is disclosed, for example, in Japanese Unexamined Patent Application Publication No. 2008-263841 and Japanese Unexamined Patent Application Publication No. 2004-194563.

A fishing rod having an attachment attached to a rod body with a resin sheet is disclosed, for example, in Japanese Unexamined Utility Model Application Publication No. S60-156963 and Japanese Unexamined Utility Model Application Publication No. H2-26474. In those publications, a sheet made of fiber-reinforced resin is used as a resin sheet.

When an attachment is manually attached to a rod body, the attachment may be mistakenly fixed to an unintended location of the rod body, or may be unintentionally fixed askew to the rod body. Also, the attachment may be damaged during use by the user. To attach a new attachment to the rod body, it is necessary to detach such attachment fixed in an unintended manner or damaged attachment from the rod body. However, an attachment firmly fixed to a rod body cannot be easily detached from the rod body. A problem has been found that efficiency in replacing the attachment is deteriorated in particular when a rod body is made of a fired fiber-reinforced resin sheet. This is because such a rod body is liable to be particularly strongly bonded to a sheet made of fiber-reinforced resin for fixing an attachment, and when the attachment is detached from the rod body, the sheet made of fiber-reinforced resin breaks and often remains on the surface of the rod body so that it is necessary to remove the remaining sheet.

It could therefore be helpful to enable an attachment fixed to a fishing rod to be efficiently replaced. Other advantages will become apparent upon reference to this specification in its entirety.

SUMMARY

We Thus Provide:

A fishing rod has a rod body and an attachment portion, and comprises: an attachment attached to the outer peripheral face of the rod body with the attachment portion; a first layer formed by winding a first sheet around both the attachment portion and the rod body; and a second layer formed by winding a second sheet made of fiber-reinforced resin on the outer side of the first sheet, wherein the tensile elongation measured in accordance with JIS K 7161-1 of the first sheet is greater than that measured in accordance with JIS K 7161-1 of the second sheet.

The tensile elongation measured in accordance with JIS K 7161 of the first sheet may be 15% or more.

The range of the tensile modulus of the first sheet may be 980 to 3500 MPa.

The first layer 100 and the second layer 200 may be formed so that when regarded as one layer, the range of the tear strength measured in accordance with JIS K 7128-1 may be 13 to 30 N/mm.

The range of the tensile break strength measured in accordance with JIS K 7161-1 of the first sheet may be 20 to 280 MPa.

The first sheet may be made by impregnating fibers made of synthetic resin with a composition containing thermoset resin.

The second sheet may be made by impregnating carbon fibers or glass fibers with a composition containing thermoset resin.

The attachment may be a fishing line guide.

The attachment may be a reel seat.

A tubular body has a cylindrical member with a cylindrical shape and an attachment, and comprises: an attachment attached to the outer peripheral face of the cylindrical member with the attachment portion; a step of winding a first sheet around both the attachment portion and the cylindrical member; and a step of winding a second sheet made of fiber-reinforced resin on the outer peripheral face of the first sheet, wherein the tensile elongation measured in accordance with JIS K 7161-1 of the first layer formed of the first sheet is greater than that measured in accordance with JIS K 7161-1 of the second layer formed of the second sheet.

A production method for a tubular body comprises: a step of preparing a cylindrical member with a cylindrical shape; a step of disposing an attachment having an attachment portion on the outer peripheral face of the cylindrical member; a step of winding a first sheet around both the attachment portion and the cylindrical member; a step of winding a second sheet made of fiber-reinforced resin on the outer peripheral face of the first sheet; and a step of fixing the attachment to the cylindrical member by thereafter heating a wound body obtained by performing the above-mentioned steps, wherein the tensile elongation measured in accordance with JIS K 7161-1 of the first sheet is greater than that measured in accordance with JIS K 7161-1 of the second sheet.

An attachment attached to a fishing rod may be efficiently replaced. Thus, for example, it is easy to detach and reattach an attachment that is attached in an unintended manner or to detach a damaged attachment and replace the same with another.

DESCRIPTION OF THE NUMERICAL REFERENCES

Figure 1:
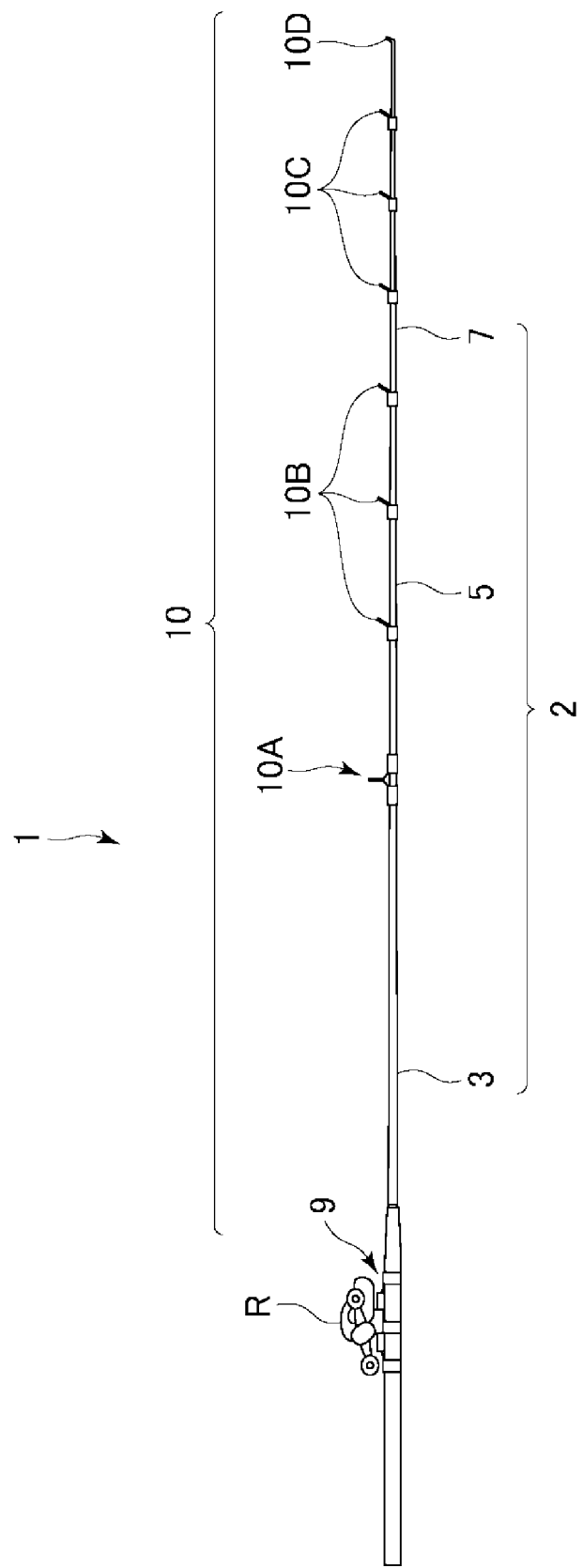
FIG. 1 shows an example of a fishing rod.

1 Fishing rod
2' Tubular body
2 Rod body
3 Base rod
5 Middle rod
7 Tip rod
9 Reel seat (attachment)
10, 10' Attachments
10A, 10B and 10C Fishing line guides (attachments)
100 First layer (layer formed by the first sheet 100S)
200 Second layer (layer formed by the second sheet 200S)
200' Second layer (layer formed by the second sheet 200S)
100S First sheet
200S Second sheet

DETAILED DESCRIPTION

Hereinafter, examples of our fishing rod will be described in detail with reference to the accompanying drawings.

FIG. 1 shows an example of our fishing rod. A fishing rod 1 is configured by jointing a base rod 3, a middle rod 5 and a tip rod 7, which are also respectively referred to as a rod. In fishing rod 1, a reel seat 9 is provided on the base rod 3, and fishing line guides for a fishing line unreeled from a reel R attached to the reel seat 9 are attached to appropriate locations of the base rod 3, the middle rod 5 and the tip rod 7, respectively. In FIG. 1, the fishing line guides provided on the base rod 3, the middle rod 5 and the tip rod 7 are indicated by 10A, 10B and 10C, respectively. Further, a top guide 10D is attached to the tip of the tip rod 7. In this example, each of the fishing line guides 10A to 10C and the reel seat 9 is an attachment 10 fixed to the surface (outer peripheral face) of the rod.

The base rod 3, the middle rod 5 and the tip rod 7 are preferably composed of a tubular body made of fiber-reinforced resin, and formed in a tubular shape of a predetermined dimension according to a standard method such as winding around a core metal a fiber-reinforced resin prepreg (prepreg sheet) in which reinforcing fibers (mainly carbon fibers and glass fibers) are impregnated with thermoset synthetic resin such as epoxy resin, and removing the core after a heating process. Each rod may be molded in various forms such as in a solid state or with a tubular body being jointed to a solid core material (e.g., a super-elastic alloy wire material and a super-elastic resin material. A rod body 2 is configured by jointing, for example, the base rod 3, the middle rod 5 and the tip rod 7.

Figure 2:
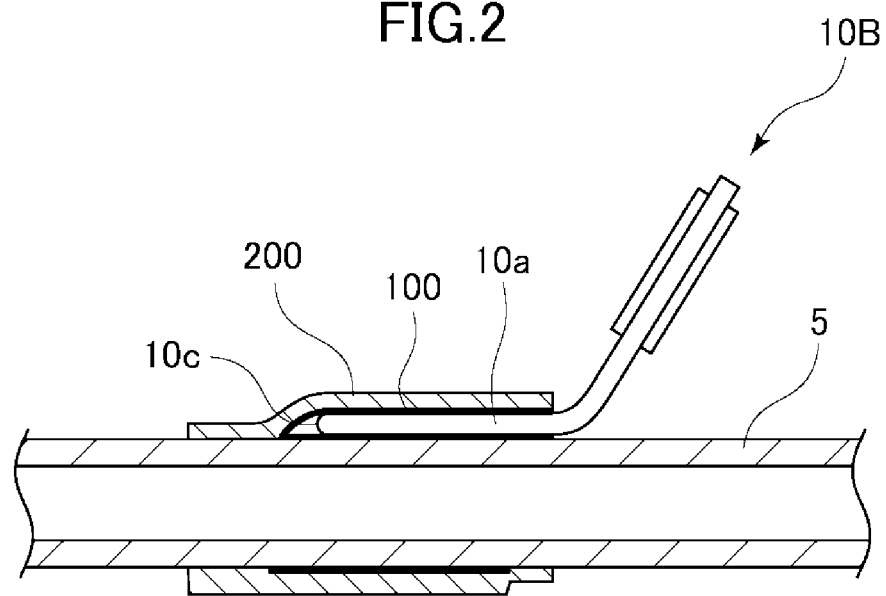
FIG. 2 shows a schematic sectional view indicating a fixed state of the leg portion of the fishing line guide of the fishing rod shown in FIG. 1.
Figure 3:
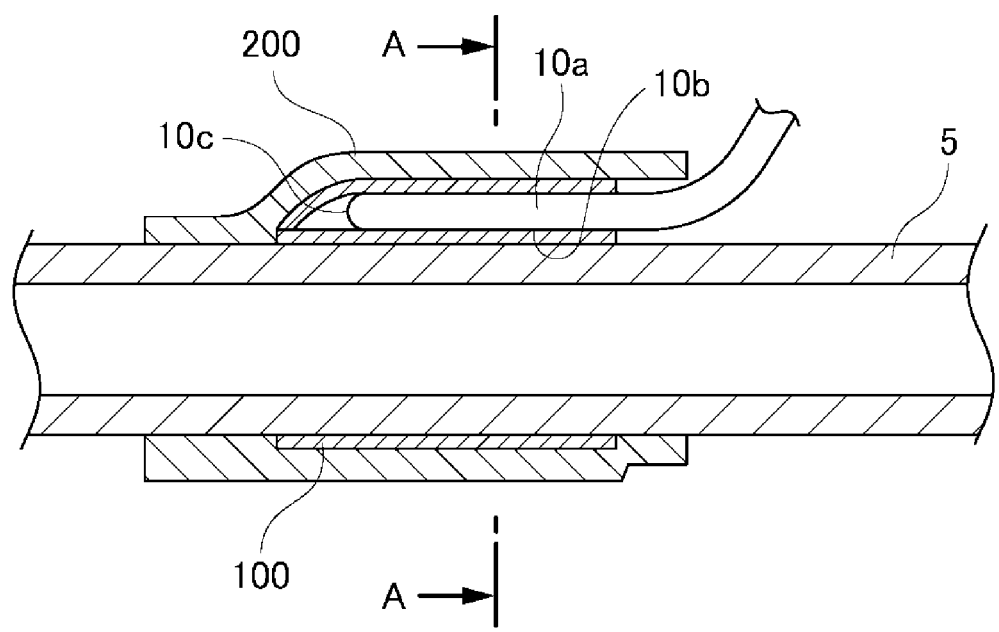
FIG. 3 shows a sectional view indicating a detailed configuration of the fixed area shown in FIG. 2.
Figure 4:
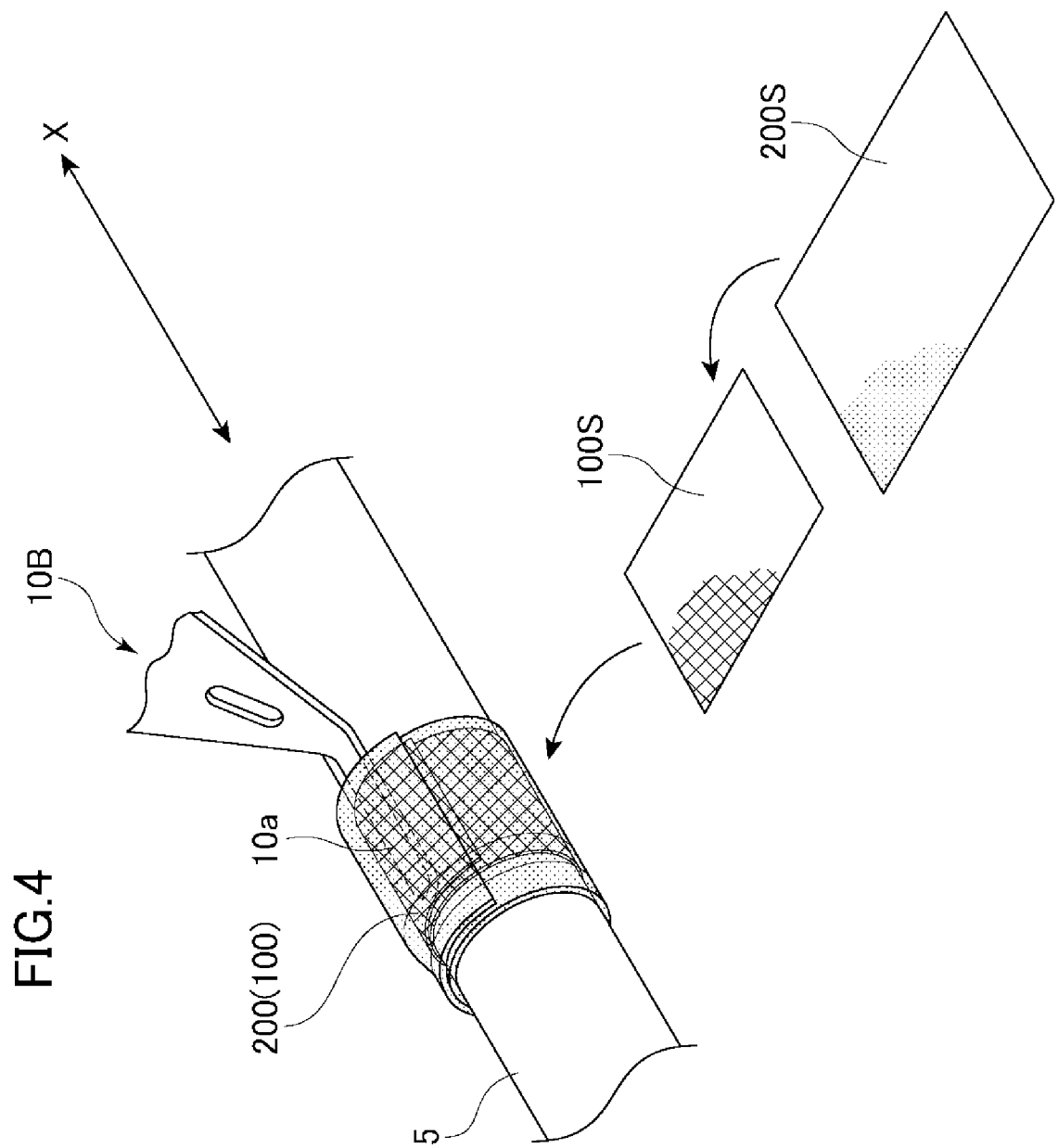
FIG. 4 shows a schematic perspective view indicating a configuration of a prepreg sheet for fixing a fixing portion of a fishing line guide to a rod.
Figure 5:
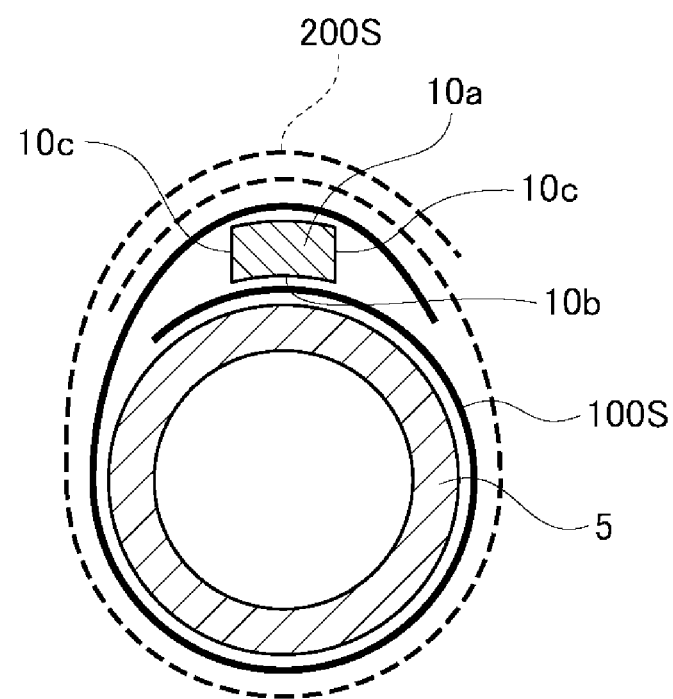
FIG. 5 shows a sectional view along the line A-A of FIG. 3.

The rod and the rod body 2 configured as described above have the outer surfaces coated or otherwise treated, to which the attachment 10 is attached. Hereinafter, a fixing method and structure of an attachment will be described with illustration of a fishing line guide 10B. FIGS. 2 to 5 show a fixing method of the fishing line guide 10B. FIG. 2 is a schematic sectional view showing a fixed state of the fixing portion (leg portion) 10a of the fishing line guide 10B of the fishing rod shown in FIG. 1. FIG. 3 is a sectional view showing a detailed configuration of the fixed area shown in FIG. 2. FIG. 4 is a schematic perspective view showing a configuration of a prepreg sheet for fixing a fixing portion of a fishing line guide to a rod. FIG. 5 is a sectional view along the line A-A of FIG. 3.

As shown in FIG. 2, the fixing portion 10a of the fishing line guide 10B, which is the attachment 10, is placed on the surface of the molded rod 5 (middle rod). Next, a portion corresponding to the first layer 100 is formed by winding the first sheet 100S on the outer peripheral faces of the fixing portion 10a and the rod 5. A portion corresponding to the second layer 200 is formed by winding the second sheet 200S on the outer peripheral face of the first sheet 100S. By heating the wound body thus obtained (as necessary), the first layer 100 and the second layer 200 are formed whereby the fishing line guide 10B is fixed to the rod 5. The fixing portion 10a is narrower in diameter than the rod 5, and extends in the axial length direction. The lower face 10b thereof is a flat surface or a curved surface with a different curvature from that of the rod. Thus, a gap is formed between the lower face 10b and the surface of the rod.

To fix the fixing portion 10a as described above, the first sheet 100S is first wound around the rod 5, and the fixing portion 10a is then interposed in between as shown in FIGS. 4 and 5. Then, the second sheet 200S is further wound around the above, fixed by a fastening tape (not illustrated) and then, inserted into a heating furnace as it is for heating treatment. However, the fixing portion 10a may also be placed in direct contact with the surface of the rod 5, then the first sheet 100S may be wound around the outer peripheral faces of the fixing portion 10a and the rod 5, and further the second sheet 200S may be wound thereover.

The tensile elongation measured in accordance with JIS K 7161-1 of the first sheet 100S for forming the first layer 100 may be greater than that measured in accordance with JIS K 7161-1 of the second sheet 200S for forming the second layer 200. Due to the tensile elongation of the first sheet 100S, the first layer 100 will have a greater tensile elongation than the second layer 200. Therefore, even in the event of breakage of the second layer 200, the first layer 100 remains unbroken, which makes it possible to peel off (separate) the second layer 200 together with the first layer 100. This prevents the broken first layer 100 and/or the second layer 200 from remaining on the surface of the rod body when the attachment 10 is detached from the rod body 2, deteriorating efficiency in replacing the attachment. The tensile elongation is the value measured in accordance with JIS K 7161-1 (2014).

To allow such peeling off, the first layer 100 may be present inside the second layer 200, further layers (e.g., coated layers) may be present outside the second layer 200, or further layers (e.g., anchor layers for improving adhesion) may be present between the second layer 200 and the first layer 100.

The tensile elongation measured in accordance with JIS K 7161-1 of the first sheet 100S may be 15% or more. The tensile elongation is more preferably 18% or more, even more preferably 19% or more, and most preferably 20% or more. When the tensile elongation of the first sheet 100S is within the above range, the first layer 100 derived from the first sheet 100S also has a corresponding tensile elongation, which is capable of more reliably preventing the breakage of the first layer 100 when the attachment 10 is detached from the rod body 2.

The range of the tensile modulus measured in accordance with JIS K 7161-1 of the first sheet 100S may be 980 to 3500 MPa. The range of the tensile modulus is more preferably 1100 to 3300 MPa, even more preferably 1500 to 3100 MPa, and most preferably 2000 to 2800 MPa. When the first sheet 100S has the above-mentioned tensile modulus, the first layer 100 derived from the first sheet 100S also has a corresponding tensile modulus, which is capable of more reliably preventing the breakage of the first layer 100 when the attachment 10 is detached from the rod body 2.

The range of the tensile break strength measured in accordance with JIS K 7161-1 (2014) of the first sheet 100S may be 20 to 280 MPa. The range of the tensile break strength is more preferably 30 to 260 MPa, even more preferably 40 to 250 MPa, and most preferably 58 to 200 MPa. When the first sheet 100S has the above-mentioned tensile break strength, the first layer 100 derived from the first sheet 100S also has a corresponding strong tensile break strength, which is capable of more reliably preventing the breakage of the first layer 100 when the attachment 10 is detached from the rod body 2.

The range of the tear strength measured in accordance with JIS K 7128-1 may be 13 to 30 N/mm when the first layer 100 and the second layer 200 are regarded as one layer. The lower limit of the tear strength is more preferably 13.5 N/mm or more, still more preferably 14 N/mm or more, even more preferably 15 N/mm or more, and most preferably 16 N/mm or more. When the attachment 10 is detached from the rod body 2, the first layer 100 and the second layer 200 must be first broken at a peeling starting point. However, the tear strength of the first layer 100 equal to or less than a predetermined value makes it easier to create the peeling starting point. On the other hand, however, the tear strength equal to or greater than a predetermined value makes the first layer 100 and the second layer 200 less likely to come off when they are peeled off from the rod body 2. A fishing rod with a tear strength within the above preferable range may be obtained by, for example, appropriately selecting the materials of the fibers and resins contained in the first sheet 100S and the second sheet 200S, or adjusting the curing temperature for forming the first layer 100 and the second layer 200, with reference to Table 1 below.

Tear strengths of various materials are shown in Table 1 below. In Table 1, the c cloth+PEs cloth shows an example where a prepreg sheet (thickness: 100 μm) in which polyester fibers are impregnated with epoxy resin is used as the first sheet 100S, and a prepreg sheet (thickness: 170 μm) in which carbon fibers are impregnated with epoxy resin is used as the second sheet 200S. The c cloth shows a prepreg sheet (thickness: 170 μm) alone in which carbon fibers are impregnated with epoxy resin. The PEs cloth shows a prepreg sheet (thickness: 100 μm) alone in which polyester fibers are impregnated with epoxy resin. The PET tape shows a stretched polyethylene terephthalate tape (thickness: 36 μm) alone. The KEVLAR shows a KEVLAR sheet (thickness: 190 μm) alone in which aramid fibers are impregnated with epoxy resin. ZXION (registered trademark) shows a sheet (thickness: 200 μm) alone in which epoxy resin is impregnated in liquid crystalline polyester fibers, produced by KB SEIREN, LTD. The c cloth+PET tape shows an example where a stretched polyethylene terephthalate tape (thickness: 36 μm) is used as the first sheet 100S, and a prepreg sheet (thickness: 170 μm) in which carbon fibers are impregnated with epoxy resin is used as the second sheet 200S. The c cloth+KEVLAR shows an example where a KEVLAR sheet (thickness: 190 μm) in which aramid fibers are impregnated with epoxy resin are used as the first sheet 100S, and a prepreg sheet (thickness: 170 μm) in which carbon fibers are impregnated with epoxy resin are used as the second sheet 200S.

The first sheet 100S is a prepreg sheet in which fibers made of synthetic resin are impregnated with a composition containing thermoset resin. The synthetic resin is a fiber made of one or more materials selected from, for example, a group consisting of polyolefin, polyamide, polyacrylonitrile and polyester, among which polyester is preferable. The synthetic resin fiber referred to herein does not include fibers made of carbon fibers or glass fibers. Thermoset resin refers to resin that irreversibly cures by a chemical reaction when heated. As the thermoset resin, urea resin, melamine resin, phenol resin, epoxy resin, unsaturated polyester resin, alkyd resin, and urethane resin, for example, may be used, among which epoxy resin is preferable. The range of the thickness of the first sheet 100S may be, for example, but not particularly limited to, 20 to 300 μm. A suitable commercial product may also be used as the first sheet 100S.

The second sheet 200S may be a prepreg sheet in which reinforcing fibers are impregnated with a composition containing thermoset resin. The reinforcing fibers include, for example, carbon fibers and glass fibers. As the thermoset resin contained in the composition with which the second sheet 200S is impregnated, urea resin, melamine resin, phenol resin, epoxy resin, unsaturated polyester resin, alkyd resin and urethane resin, for example, may be used. The thermoset resin contained in a composition with which the second sheet 200S is impregnated has a lower curing temperature than that contained in a composition with which the first sheet 100S is impregnated. For example, when the first sheet 100S is impregnated with a composition containing epoxy resin which cures at 120° C., the second sheet 200S may be impregnated with a composition containing epoxy resin which cures at 80° C. The range of the thickness of the second sheet 200S may be, for example, but not particularly limited to, 20 to 300 μm. A suitable commercial product may also be used as the second sheet 200S.

A composition to be impregnated in the first sheet 100S or the second sheet 200S is the one mainly composed of thermoset resin, and may contain known additives or the like. When the composition contains thermoset resin and additives, given that the total mass of the composition is 100%, it is preferable that the mass of the thermoset resin accounts for 50% or more. The thermoset resin may also account for 60% or more, 70% or more, 80% or more, or 90% or more.

Given that the total mass of the reinforcing fibers and the thermoset resin contained in the first sheet 100S is 100 mass %, it is preferable that the amount of the thermoset resin contained in the first sheet 100S accounts for 50 mass % or more. This amount is more preferably 60 mass %.

Given that the total mass of the reinforcing fibers and the thermoset resin contained in the second sheet 200S, is 100 mass %, it is preferable that the amount of the thermoset resin contained in the second sheet 200S accounts for 20 to 50 mass %. This amount more preferably accounts for 30 to 40 mass %.

The first sheet 100S and the second sheet 200S may simply be formed of thermoset resin based sheets. However, in consideration of the fixing strength of the attachment 10 to the rod body 2, the stability of the resin flow, the improvement of the durability, and the improvement of the workability (the resin sheet is liable to be deformed or damaged during work), it is preferable to use a prepreg sheet in which fibers are impregnated with thermoset resin as a material for fixing the attachment 10. Though only one of the first sheet 100S and the second sheet 200S may be a prepreg sheet, it is preferable that both of them are prepreg sheets.

As the first sheet 100S, it is preferable to use a sheet in which fibers are aligned in a direction at a predetermined angle to the extending direction of the rod body 2 (e.g., fibers aligned with an inclination angle of 45° to the axial length direction X; see FIG. 4; or fibers woven in plain weave that are inclined at a predetermined angle (e.g., 45°) to make winding easier) in consideration of the strength, scratch resistance and the like. As the second sheet 200S, it is preferable to use a sheet in which fibers are woven in plain weave (e.g., fibers oriented at angles of 0° and 90° to the axial length direction X; see FIG. 4) to make winding easier and make misalignment less likely to occur. However, the orientation directions of the fibers contained in the first sheet 100S and the second sheet 200S are not limited to the above-mentioned directions.

The first sheet 100S may also be cut into not more than one ply and placed on the surface of the rod body 2, or cut into one ply or more and wound around the rod. When the number of turns of the first sheet 100S around the rod is two or more plies, it increases the weight or makes winding less easier. Therefore, as shown in FIG. 5, it is preferable that the number of turns is 2 plies or less, and that the fixing portion 10*a* of the fishing line guide 10B is interposed in the overlapping portion after one ply is laid. That is, by interposing the fixing portion in the overlapping portion, the fishing line guide 10B may be stably fixed, which improves the workability. However, the number of turns of the first sheet 100S is not limited to the above-mentioned number of plies.

The fixing portion 10*a* fixed to the rod body 2 with the first sheet 100S is further fixed by winding the second sheet 200S around the outer peripheral portion of the first sheet 100S. It is preferable that the ratio of the area to be wound with the first sheet 100S to the area to be wound with the second sheet 200S is 50% or more. The ratio is more preferably 60% or more, even more preferably 70% or more, and most preferably 80% or more. The area to be wound with the first sheet 100S is not the total area of the sheet, but the area of the first sheet 100S on the outer peripheral face of the rod body 2. In other words, the area to be wound with the first sheet 100S refers to an area in which the overlapping portion of the sheet is considered to be wound only with one ply. The same also applies to the area to be wound with the second sheet 200S. The first layer 100 provides enough physical strength to prevent the attachment 10 from coming off when it is separated from the rod 2. Therefore, if the afore-mentioned area ratio is maintained, the second sheet 200S is further supported in its entirety by the first sheet 100S, and better peelability is ensured. To prevent the thermoset resin contained in the first sheet 100S from leaking, the area ratio is preferably less than 100%, or more preferably 95% or less. In other words, it is preferable that the second sheet 200S is wound to cover the entire first sheet 100S.

By heating the rod body 2 wound with the first sheet 100S and the second sheet 200S, the attachment 10 is fixed to the rod body 2. This heating may be performed using a known heating furnace. When the temperature rises, and the first sheet 100S and the second sheet 200S reach or exceed the curing temperature of the thermoset resin contained in each sheet, the thermoset resin cures rapidly. The thermoset resin contained in the outer first sheet 100S with a lower curing temperature cures first, and then the thermoset resin of the inner second sheet 200S with a higher curing temperature cures, whereby the fishing line guide 10B becomes fixed.

Heating may be performed by inserting the rod 5 (rod body 2) into a heating furnace maintained at a predetermined temperature. The range of the temperature may be, for example, but not particularly limited to, 70 to 170° C. It is more preferably 80 to 160° C., even more preferably 85 to 150° C., and most preferably 90 to 120° C. The range of the heating time in the heating furnace maintained at a predetermined temperature may be, for example, but not particularly limited to, 5 minutes to 3 hours, more preferably 15 minutes to 2.5 hours, and even more preferably 30 minutes to 2 hours.

Though the fishing rod 1 shown in FIG. 1 has been jointed by an ordinarily jointed type, each rod may be jointed by a drawing type, a inversely jointed type or a socket-and-spigot jointed type. There may or may not be a plurality (two or more) of middle rods. In addition, the whole may consist of a single pole rod. Further, the attachment may also be fixed in the way referred to above when fixing not only a fishing line guide but also the reel seat 9 shown in FIG. 1.

Figure 6:
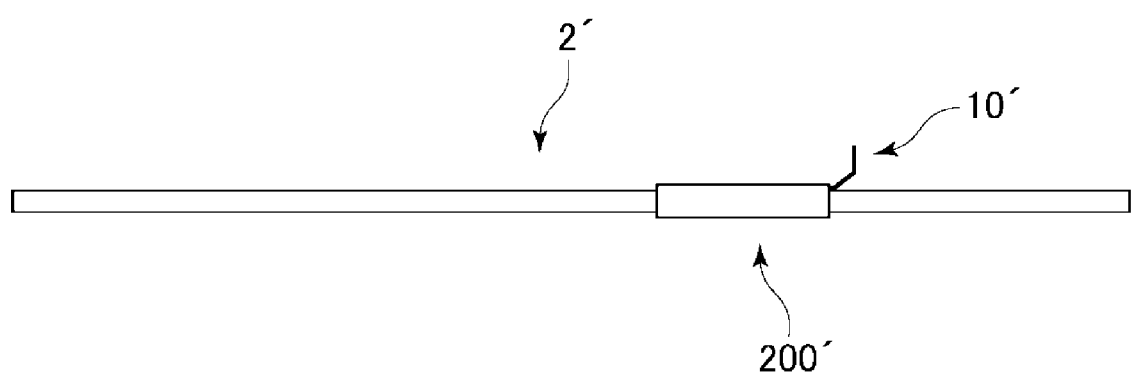
FIG. 6 shows an example of a tubular body.
Figure 7:
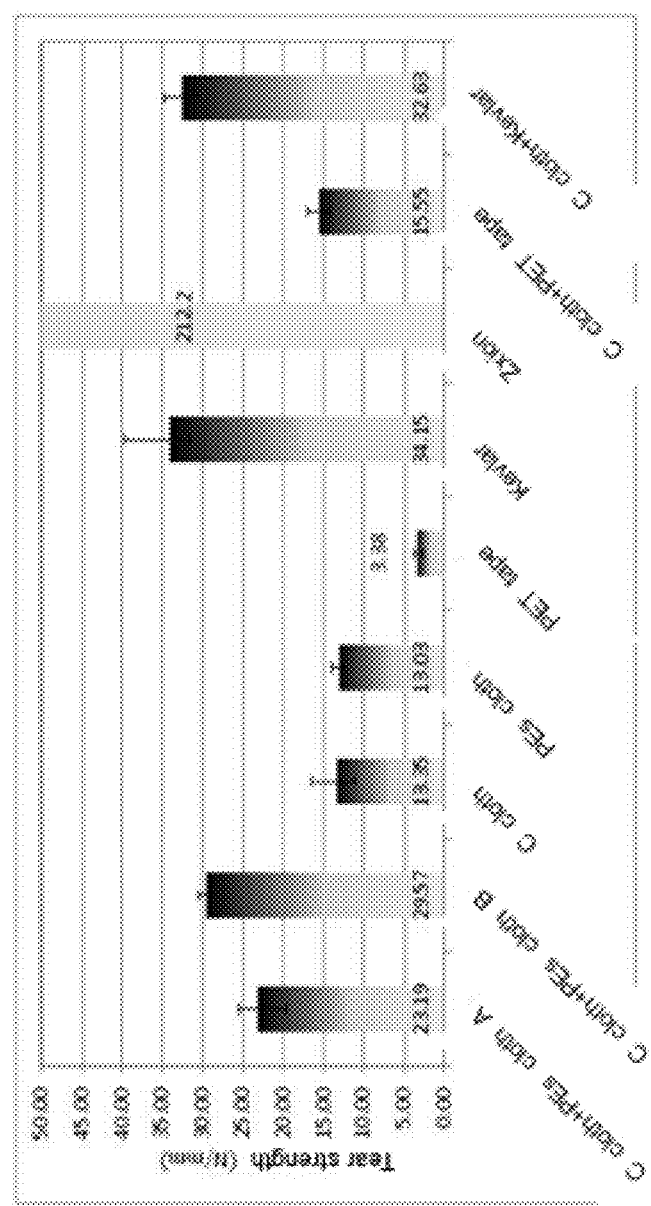
FIG. 7 shows tear strengths of various materials.

We also provide a tubular body 2' having a tubular member. As shown in FIG. 6, the tubular body 2' has an elongated cylindrical shape. An attachment 10' is fixed to the tubular body 2' with a second layer 200' and a first layer (which lies inside the second layer 200' and is not shown in FIG. 6). A tubular body may also be, for example, a member (rod) used as part of the fishing rod 1 such as the base rod 3, the middle rod 5 and the tip rod 7. The tubular body 2', which is part of the fishing rod, may have an example similar to the specific example of the fishing rod 1 shown in FIGS. 2 to 5 and the descriptions thereof, except that it does not have a full function as a single fishing rod. Also, the tubular body 2' according to an example may be used for any purposes which require a flexible tubular body. The tubular body 2' may exert an effect of being able to efficiently replace an attachment regardless of its intended use.

The dimensions, materials and arrangements of each component described herein are not limited to those explicitly described in the examples, and each component may be deformed to have any dimension, material and arrangement that may be included within the scope of this disclosure. Further, components that are not explicitly described herein may be added to the described examples, or some of the components described in each examples may also be omitted.

What is claimed is:

1. A fishing rod having a rod body, the fishing rod comprising:
   an attachment having a fixing portion and being attached to an outer peripheral face of the rod body;
   a first layer wound on the rod body and the fixing portion; and
   a second layer wound on an outer side of the first layer, wherein the second layer is made of fiber-reinforced resin,
   wherein a lowermost surface of the fixing portion is secured to an upper surface of the first layer such that the fixing portion is interposed between overlapping portions of the first layer,
   wherein a tensile elongation measured in accordance with JIS K 7161-1 of the first layer is greater than a tensile elongation measured in accordance with JIS K 7161-1 of the second layer.

2. The fishing rod according to claim 1, wherein the tensile elongation measured in accordance with JIS K 7161-1 of the first layer is 15% or more.

3. The fishing rod according to claim 1, wherein a tensile modulus of the first layer is 980 to 3500 MPa.

4. The fishing rod according to claim 1, wherein the first layer and the second layer are formed so that when regarded as one layer, a strength measured in accordance with JIS K 7128-1 is 13 to 30 N/mm.

5. The fishing rod according to claim 1, wherein a tensile break strength measured in accordance with JIS K 7161-1 of the first layer is 20 to 280 MPa.

6. The fishing rod according to claim 1, wherein the first layer is made by impregnating fibers made of synthetic resin with a composition containing thermoset resin.

7. The fishing rod according to claim 1, wherein the second layer is made by impregnating carbon fibers or glass fibers with a composition containing thermoset resin.

8. The fishing rod according to claim 1, wherein the attachment is a fishing line guide.

9. The fishing rod according to claim 1, wherein the attachment is a reel seat.

10. A tubular body having a cylindrical member with a cylindrical shape, the tubular body comprising:
- an attachment having a fixing portion and being attached to an outer peripheral face of the cylindrical member;
- a first layer wound on the cylindrical member and the fixing portion; and
- a second layer wound on an outer peripheral face of the first layer, wherein the second layer is made of fiber-reinforced resin,
- wherein a lowermost surface of the fixing portion is secured to an upper surface of the first layer such that the fixing portion is interposed between overlapping portions of the first layer,
- wherein a tensile elongation measured in accordance with JIS K 7161-1 of the first layer is greater than a tensile elongation measured in accordance with JIS K 7161-1 of the second layer.

11. A method of producing a tubular body comprising:
- a step of preparing a cylindrical member with a cylindrical shape;
- a step of disposing an attachment having a fixing portion on an outer peripheral face of the cylindrical member;
- a step of winding a first sheet around both the cylindrical member and the fixing portion;
- a step of winding a second sheet made of fiber-reinforced resin on an outer peripheral face of the first sheet, wherein a lowermost surface of the fixing portion is secured to an upper surface of the first sheet such that the fixing portion is interposed between overlapping portions of the first sheet; and
- a step of fixing the attachment to the cylindrical member by thereafter heating a wound body obtained by performing the above mentioned steps,
- wherein a tensile elongation measured in accordance with JIS K 7161-1 of the first sheet is greater than a tensile elongation measured in accordance with JIS K 7161-1 of the second sheet.

\* \* \* \* \*

UNITED STATES PATENT AND TRADEMARK OFFICE
CERTIFICATE OF CORRECTION

| | | |
|---|---|---|
| PATENT NO. | : 11,793,182 B2 | Page 1 of 1 |
| APPLICATION NO. | : 16/488652 | |
| DATED | : October 24, 2023 | |
| INVENTOR(S) | : Kawamura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this
Nineteenth Day of August, 2025

Coke Morgan Stewart
*Acting Director of the United States Patent and Trademark Office*